(12) United States Patent  
Fenne

(10) Patent No.: US 6,470,048 B1
(45) Date of Patent: Oct. 22, 2002

(54) FREQUENCY-BASED VIDEO DATA SUBSTITUTION FOR INCREASED VIDEO COMPRESSION RATIOS

(75) Inventor: Adam Michael Fenne, San Juan Capistrano, CA (US)

(73) Assignee: Pixelon.com, Inc., North Hollywood, CA (US)

( * ) Notice: Subject to any disclaimer, the term of this patent is extended or adjusted under 35 U.S.C. 154(b) by 0 days.

(21) Appl. No.: 09/351,618

(22) Filed: Jul. 12, 1999

(51) Int. Cl.[7] .................................................. H04N 7/26
(52) U.S. Cl. ...................................... 375/240; 704/501
(58) Field of Search ........................... 375/240; 380/210; 704/225, 226, 501, 205; H04N 7/26

(56) References Cited

U.S. PATENT DOCUMENTS 4,876,617 A * 10/1989 Best et al. ..................... 360/68
4,878,113 A * 10/1989 Nakamura .................. 348/164
5,294,974 A * 3/1994 Naimpally et al. ...... 348/395.1
5,319,735 A * 6/1994 Preuss et al. ............... 704/205
6,307,971 B1 * 10/2001 Persiantsev et al. ........ 382/236

* cited by examiner

Primary Examiner—Howard Britton
(74) Attorney, Agent, or Firm—Howrey Simon Arnold & White

(57) ABSTRACT

Frequency information is selectively removed from a video signal in order to decrease the number of color values required for video compression. Removal of the frequency information includes both periodic raking out of narrow frequency bands, and rounding of frequency values. The frequency information removal is carried out selectively in those portions of the visible light spectrum in which the human eye's color response is strongest, thus allowing increases in video compression ratios without visible degradation of image quality.

6 Claims, 2 Drawing Sheets

FREQUENCY-BASED VIDEO DATA SUBSTITUTION FOR INCREASED VIDEO COMPRESSION RATIOS

BACKGROUND OF THE INVENTION

1. Field of the Invention

This invention relates to spectral-based data compression, and more particularly to the field of frequency-based data substitution for enhanced video compression rations.

2. Background of the Invention

Digital storage and/or transmission of video data has applications in entertainment, video conferencing, education, medicine, and virtually any application where moving pictures are desired. Video data requires large bandwidths whether the video data is to be stored, or transmitted over finite bandwidth transmission media such as modems and various other Internet connections. Various algorithms and systems exist for encoding and compressing video data, including the audio data that is normally included within the video data. One such standard is the Motion Pictures Expert Group (MPEG) standard which is the ISO/IEC 11172 standard entitled "Coding of Moving Pictures and Associated Audio For Digital Storage Media At Up To About 1.5 Mbit/s." However, 1.5 Mbit/s is too high a digital data rate to enable real time video playback over Internet connections, even including digital subscriber line (DSL) connections. Accordingly, a need exists for improved techniques for compressing and encoding sensory stimulus data streams such as video data streams, audio data streams, or combined video/audio data streams.

SUMMARY OF THE INVENTION

In the invention, frequency information is selectively removed from a video signal. The removal of the frequency information includes reducing the magnitude of certain frequencies to zero. This magnitude reduction process can be thought of as color "raking." The color raking is performed periodically in the frequency spectrum. The removal of frequency information further includes oversaturation, which is the shifting of certain color values to nearby color values. The oversaturation process can be thought of as color rounding. Both the color raking and the color rounding is performed in portions of the visible spectrum in which the human eye will not noticeably perceive that video information has been lost, i.e., the image quality will not be visibly degraded. In this way the cardinal number of color values within the video signal is decreased. This reduces the number of colors values that a video data compressor needs within its color palette, thus reducing the computational load on the video compressor and reducing the bit rate required to support video image transmission and/or reproduction. That is, the compression ratios are increased. The invention therefore takes advantage of strengths and weaknesses in the ability of the rods and cones within the human eye to perceive colors of varying magnitudes and wavelengths.

The present invention also includes matching of a reduced spectrum lighting source with a reduced color palette within the data compressor. The use of the reduced spectrum lighting source allows the size of the color palette to be reduced without visible degradation in image quality, thus further enhancing the compression ratios. The present invention further includes filtering the video signal with a filter whose frequency response is generally the reverse of the human eye's spectral response to the output of a video playback device such as a computer monitor.

The above-described features and other features and benefits of the present invention will become clear to those skilled in the art when read in conjunction with the following detailed description of a preferred illustrative embodiment and viewed in conjunction with the attached drawings and appended claims.

DETAILED DESCRIPTION OF THE PREFERRED EMBODIMENTS

Figure 1:
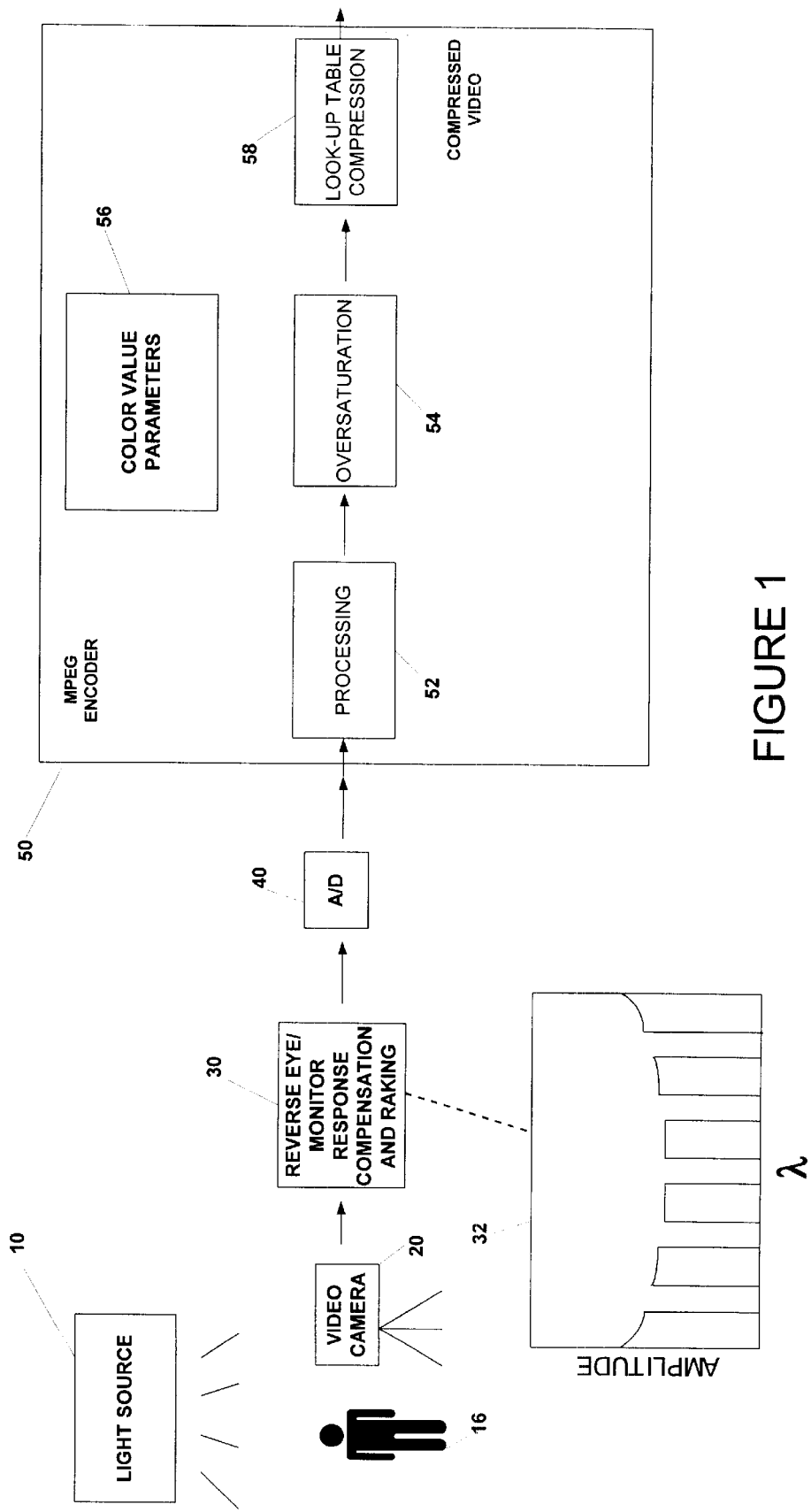
FIG. 1 is an overall block diagram of the present invention.

In order to compress a video data signal and re-create a high quality version of the video image captured, a first analog filter is supplied to an incoming analog video data stream such as an NTSC video data stream. The first analog filter has a frequency response characteristic that is, as a first approximation, the reverse of the human eye's spectral sensitivity response. If a video stream is expected to be displayed on a video playback device having know characteristics, the human eye's response to video signals displayed on that video playback device can be determined. As a second approximation therefore, the first filter's frequency response characteristic is the inverse of the human eye's response to the video playback device's output in response to the video signal. For example, suppose that a video data stream comprising a popular movie is intended and perhaps has been captured and optimized for playback on a home television set. Now suppose that instead of being played on television, the movie will be downloaded over the Internet for playback on a personal computer monitor. The spectral response of the monitor to the video signal will not be the same as the response of a television screen. The viewer's perception of the monitor's output may create a still further change in the colors perceived by the viewer. The combined effect of the computer monitor's response and the human eye's response to the computer monitor's output creates a certain perceived color distortion. The movie played back on the computer monitor will not look "right" to the viewer because of this perceived color distortion. To compensate for this effect, the expected response characteristics of the computer monitor can be characterized or at least estimated as a generalized response for computer monitors in general, and the response characteristics of the perception compensation filter set so as to perform the "reverse" of the perceived color distortion. This will make the movie played back on the computer monitor look more like a movie played back on the familiar television screen. In this way, the first analog filter compensates for the combined effect of the output display device's distortion of the video signal combined with the human eye's perception of that video output. The first filter therefore results in a more realistic and sharp looking picture for the viewer.

A second filter selectively and periodically "rakes" the spectrum to remove certain spectral values. This raking is shown illustratively by the missing wavelength bands in response plot 32 of FIG. 1. Since the visible light spectrum corresponds to the color pallet, removing portions of the spectrum translates to removing colors from the color pallet that is available to the system. If the raking is performed in narrow bands, the human eye does not perceive the missing color values. For example, a patch of color on a video screen normally will contain a range of wavelength values. If every fifth nanometer (nm) of wavelength is raked from the image (i.e., wavelengths of 500 to 504 nm are left in the data stream but data of 505 nm is removed, 506 to 509 nm data are left in the data stream but 510 nm data is removed, etc.), for most images the human eye will not be able to perceive that those narrow bands of colors have been raked out. The advantage to raking out color values from the spectrum and consequently removing color values from the color pallet, is that the video data compressor now has fewer possible color values which it must recognize, store, and eventually retrieve. This simplifies the job of the compressor, especially the motion vector calculations, thus increasing the throughput rate of the compressor. This is particularly true in a compressor which employs a look-up table (LUT) as part of its compression mechanism. The rakings may be performed so as to rake out at least 5%, at least 10%, at least 20% or even more of the spectral content within the high response portion of the visible light spectrum. In the preferred embodiment, the raking of every fifth nm defines a 20% reduction in the removal of frequencies within that spectrum subset.

In the present discussion, the terms "wavelength" and "frequency" will be used interchangeably for convenience of discussion. FIG. 1 is a system diagram incorporating the present invention. A light source 10 illuminates a video subject 16. The video image of video subject 16 is captured by video camera 20 which produces a video signal. The video signal will be assumed to be an NTSC video stream for illustrative purposes. However, it is to be understood that the video stream could be in PAL or SECAM format, or other video format. Typically, the recorded video includes audio information. The present invention is applicable to sensory stimulus signals such as video, audio, video containing audio, or other similar signals.

Figure 2:
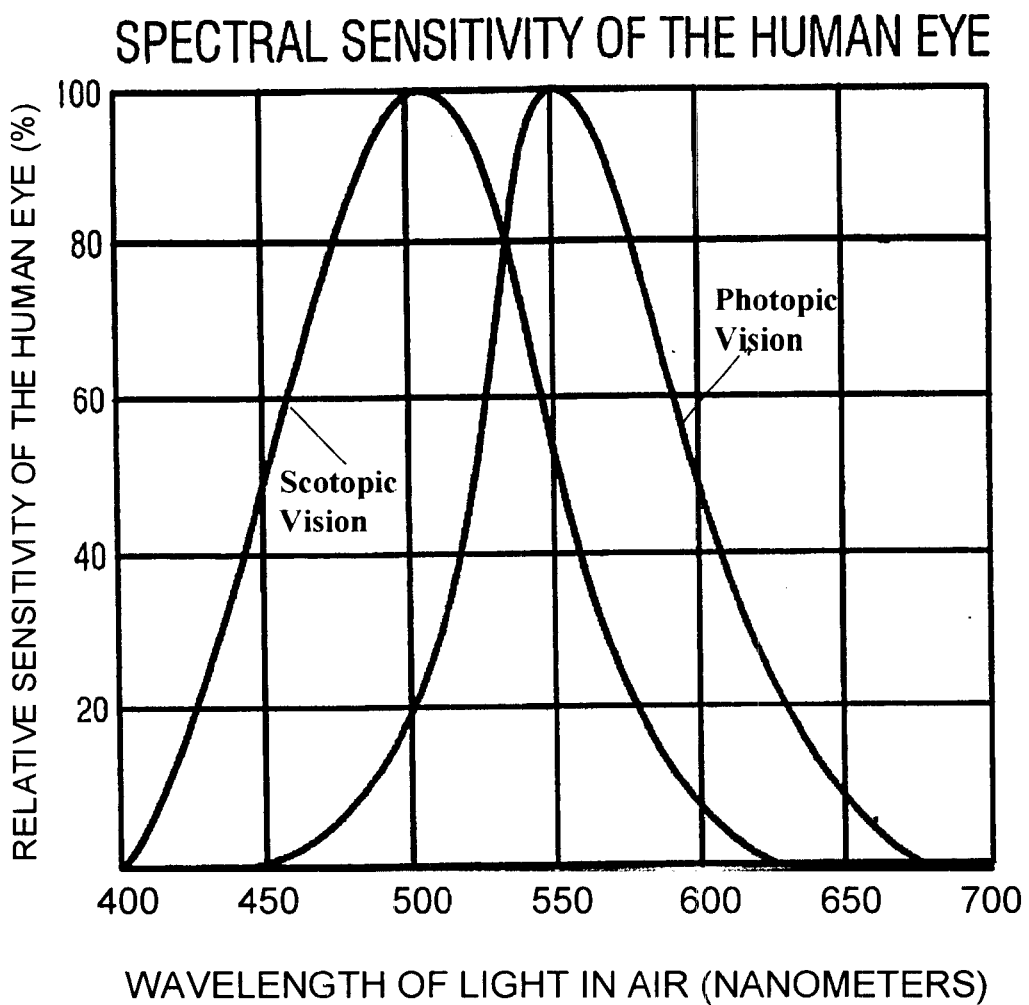
FIG. 2 is graph showing the spectral sensitivity of the human eye.

The NTSC video data stream is input to filter 30, which performs reverse eye/monitor response compensation, and raking. The combined filtering is illustrated as generalized response plot 32 of the frequency response characteristics of filter 30. The frequency response includes a generally concave curve to compensate for the generally convex eye response characteristic curve which is shown in FIG. 2. In the frequency response curve 32, various frequencies have been raked out. In an illustrative embodiment which has been shown to produce good results, the filter extends from 330 nm–780 nm. In the mid range of the filter between the wavelength of 400 and 600 nm, every fifth nm of wavelength is removed. The 40 or so raking lines in the illustrative embodiment are not shown in FIG. 1; instead, for simplicity of illustration FIG. 1 shows only five raking lines in the wavelength response curve 32. The rakings may be accomplished by a series of notch filters. Using presently available components, filter 30 is most practically implemented in analog hardware. The raking is advantageously implemented in the spectral band in which the human eye's color response is strongest and therefore in the bands in which the eye is less likely to perceive that slices of the band have been raked out. The raking is therefore performed in a predetermined color band in which the eye's color response is strongest, and no raking or less raking is performed in frequency bands in which the eye's color response is weakest. In the illustrative embodiment, the raking is performed at every fifth nm within the range of 400–600 nm, and is not performed outside of that region.

After the video signal has been filtered, it is then digitized in analog to digital (A/D) converter 40, and then passed to a video compression and encoder chip such as a standard, commercially available MPEG encoder chip 50. MPEG encoder chips typically include an on-board digital signal processor (DSP) with a number of programmable functions.

The next type of data substitution that is performed in order to increase the video data compression ratio, will be termed "oversaturation." The oversaturation stage is performed within the MPEG encoder chip in the illustrative embodiment. In oversaturation, color values within the data stream are replaced by nearby color values in order to decrease the number of color values necessary within the pallet. A range of color values are all replaced by a single value. For instance, all of the wavelengths within the range of 645 to 655 nm would be replaced with the value of 650 nm. The oversaturation process can also be thought of as color rounding. The point is to reduce the number of color values and thus reduce the number of colors within the color pallet that the compressor/encoder chip must deal with. When the compressor/encoder includes a look-up table as part of its compression mechanism, the number of values within the LUT is significantly decreased, thereby significantly increasing the processing throughput rate and decreasing the number of bits within data stream necessary to reproduce a video image with a given level of precision. That is, the bit rate of a compressed video data stream can be decreased while still maintaining high quality video reproduction. When the color rounding is performed in the digital domain as in the illustrative embodiment, the rounding is performed with respect to binary boundary values such that certain binary values are replaced by other binary values. Those binary values do not necessarily correspond to integer wavelength values or integer wavelength intervals. However, integer wavelengths and integer intervals will be referred to herein for simplicity of discussion.

In the preferred embodiment, the color rounding is performed only in the higher half of the spectrum. The spectrum portion is selected by the response of the eye to the computer monitor or other video reproduction device that will be employed. This helps to ensure that the video information which is lost by the data substitution process occurs in a spectral range in which the eye is least likely to perceive the loss of that data. In the preferred embodiment, the color value rounding is performed within the range of 500–750 nm at 10 nm rounding intervals.

The invention described above was implemented in a video storage and playback system. The invention allowed the number of color values within the color palette to be reduced from 65 million to 32 million possible color values. This allowed the data rate to be reduced from about 1 Mbit/s to 600 Kbit/s, while still maintaining high quality video reproduction.

Additional reductions in compressed bandwidth can be obtained, either with or without other inventive elements previously described, by illuminating the video subject with a light source having a predetermined spectral band that is concentrated within a subset of the visible light spectrum, producing a video signal representative of the illuminated video subject, eliminating from the video signal color values which fall outside of the subset of the visible light spectrum, and then compressing the video signal using a compressor that substantially ignores color values that fall outside of that spectral subset. In the illustrative embodiment, light source 10 in FIG. 1 is a commercially available light source designated VIDDESCENCE. That source emits light nearly entirely in the interval of 390–690 nm. Its spectral distribution is also in generally reverse distribution to the eye's response, which eliminates the need for the concave shaped filter previously described. It is believed that the VIDDESCENCE light was designed so that, even though its spectral content constitutes an abnormal lighting source, its distribution of power within that 390–690 nm spectrum is such that the human eye perceives the resulting illuminated image as being natural looking. The intended advantage was that illuminated subjects such as actors in a studio would not be overheated by receiving a full spectrum of both visible and invisible light, but would still be illuminated in a way that makes the illuminated and reproduced scene appear normal. The present invention takes advantage of this reduced spectrum, by eliminating from the color palette those wavelengths that fall outside the nominal emission spectrum of the light. That is, the color values available to the processor need not include any color values outside of the range of 390–690 nm. In normal studio conditions, there may be lights present other than the VIDDESCENCE light, such as light bulbs in the distance which are not intended for illuminating the subject but are otherwise present in the studio. In such a case, there will still be some components of the received image which fall outside of the 390–690 nm range. The amplitudes of those components will be small and unintended. Unless those extraneous wavelengths are filtered out or the processor is otherwise instructed to ignore them, those components will still be processed by the encoder thus creating overhead for the encoder and transmission bandwidth made necessary by those components. Therefore, the color value parameters 56 stored in the MPEG encoder chip 50 instruct the encoder to ignore color values outside of the designated 390–690 nm range. That is, the MPEG chip will substantially not encode any color values which fall outside of the 390–690 spectral subset. This further reduces the number of color values with which the video compressor must work, thus further increasing the video compression ratio while still maintaining a high quality reproduced video image.

For compressing of audio data or the audio portion of video signals, the spectral filtering described above will be modified according to the well documented spectral response of human auditory receptors, rather than visual receptors. As with the video filtering, the audio filtering will be subject to some experimentation in order to achieve the best actual perceived quality of the audio playback signal. Although well suited for increasing the compression ratios of moving video images, the present invention is also applicable to compressing still video images.

It will be appreciated that the term "present invention" as used herein should not be construed to mean that only a single invention having a single essential element or group of elements is presented. Rather, each novel and nonobvious element constitutes a separate invention. Further, each novel and nonobvious combination of elements enabled by the present disclosure, whether the individual elements therein be old elements, new elements, or any combination thereof, further constitutes an additional separate invention.

Although the present invention has thus been described in detail with regard to the illustrative embodiments and drawings thereof, it should be apparent to those skilled in the art that various adaptations and modifications of the present invention may be accomplished without departing from the spirit and the scope of the invention. Different embodiments using currently available technologies and tools will be readily apparent to those skilled in the art, and even still further embodiments will be apparent to those skilled in the art as different technologies progress and improve. For example, although the color raking and eye perception compensation is performed using analog filters and the oversaturation is implemented digitally in the illustrative embodiment, it will be readily apparent that filtering can generally be performed using either analog or digital filters, depending on which type of filter happens to be most convenient and practical for a particular desired function. It will also be appreciated that digital filtering can generally be performed either in the time domain or in the frequency domain, or using any number of various other mathematical transforms. Again, the implementation of a particular filter using a particular technique is a matter of convenience, economy, commercial availability, design choice, and other well known design considerations.

Similarly, the compressor/encoder used need not be an MPEG encoder. The present invention may be used with any compression mechanism which will benefit from the removal from the incoming data of information so as to reduce the number of data values which must be stored, manipulated, and/or transmitted. Nor is it necessary that the signal be a video signal; the signal may be any signal whose compression ratio may be increased by the selective removal of information which will not noticeably degrade the accuracy of data reproduction. It will also be appreciated that in the data removal such as the data raking and data rounding illustrated herein, the exact parameters for the raking and rounding are somewhat arbitrary, and are subject to experimental determination of acceptable or optimal parameters given system performance requirements such as maximum data bit rate, computational throughput rate, image quality, and the like. For example, although the raking is described as being performed periodically, it is not necessary that the wavelength intervals between raking lines be consistent or that the raking lines have uniform width. Such variations are intended as being within the scope of the term "periodic".

Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method of compressing a video data stream comprising the steps of:

selectively removing a plurality of separate visible color value bands from the video data stream in order to reduce a cardinal number of color values within said video data stream;

digitizing the video signal; and compressing said digitized video signal.

2. The method of claim 1 wherein said visible color value bands comprise at least 5% of a spectral band from which said color value bands are removed.

3. The method of claim 1 wherein said visible color value bands comprise at least 10% of a spectral band from which said color value bands are removed.

4. A method of producing and compressing a video data stream, the method comprising the steps of:

illuminating a video subject with a known lighting source having a predetermined spectral band concentrated within a subset of a visible light spectrum;

producing a video stream representative of said illuminated video subject;

first filtering said video stream in reverse compensation for a human eye's expected response to a video reproduction device's output;

periodically removing color values from a predetermined high eye response band of said video stream in order to decrease possible color values numbers within said filtered data stream;

replacing a first range of color values in said data stream with first replacement color values in order to decrease possible color value numbers within said data stream;

eliminating from said data stream color values which fall outside of said subset of the visible light spectrum; and compressing said video data stream.

5. The method of claim 4 wherein:

said first filtering defines a generally convex shaped frequency response; and said replacing is performed within a range of approximately 500 to 750 nm.

6. The method of claim 4, wherein:

said video stream is an NTSC video stream, and said compression is MPEG compressing.

\* \* \* \* \*